(12) United States Patent
Otero et al.

(10) Patent No.: US 10,791,105 B2
(45) Date of Patent: Sep. 29, 2020

(54) CREDENTIAL-BASED PROACTIVE DISCOVERY OF REMOTE MICRO-SERVICES BY SPREADSHEET APPLICATIONS

(71) Applicant: Microsoft Technology Licensing, LLC, Redmond, WA (US)

(72) Inventors: Carlos Augusto Otero, Seattle, WA (US); Ehab Sobhy Deraz, Bellevue, WA (US); Christopher John Gross, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 15/481,865

(22) Filed: Apr. 7, 2017

(65) Prior Publication Data
US 2018/0295118 A1 Oct. 11, 2018

(51) Int. Cl.
*H04L 29/06* (2006.01)
*G06F 21/31* (2013.01)
(Continued)

(52) U.S. Cl.
CPC ............ *H04L 63/08* (2013.01); *G06F 9/4451* (2013.01); *G06F 9/44526* (2013.01);
(Continued)

(58) Field of Classification Search
CPC ....... H04L 63/08; H04L 67/16; H04L 67/306; H04L 67/10; G06F 9/4451; G06F 9/44526; G06F 21/31; G06F 21/41; G06F 21/629
See application file for complete search history.

(56) References Cited

U.S. PATENT DOCUMENTS 7,080,078 B1 * 7/2006 Slaughter ................ G06F 9/465
8,151,116 B2 * 4/2012 van der Horst ......... G06F 21/42
705/405
(Continued)

FOREIGN PATENT DOCUMENTS

TW 201612831 A 4/2016

OTHER PUBLICATIONS

"Access Token—Wikipedia, the Free Encyclopedia", Retrieved From: https://en.wikipedia.org/w/index.php?title=Access%20token &oldid=605535962, Retrieved on: Apr. 25, 2016, 3 Pages.
(Continued)

*Primary Examiner* — Meng Li (57) ABSTRACT

The techniques described herein facilitate proactively discovery of remote micro-services by spreadsheet applications, e.g., Microsoft Excel®. In an implementation, a method of operating a spreadsheet application to proactively discover remote micro-services based on credential information is disclosed. The method includes identifying the credential information associated with a user of the spreadsheet application responsive to detecting a micro-service updating event and proactively discovering one or more micro-services that are available to the user of the spreadsheet application through a cloud service platform based on the credential information. The method further includes persisting a list including the one or more micro-services that are available to the user of the spreadsheet application based on the credentials.

20 Claims, 7 Drawing Sheets

(51) Int. Cl.
  *H04L 29/08* (2006.01)
  *G06F 9/445* (2018.01)
  *G06F 21/41* (2013.01)
  *G06F 21/62* (2013.01)

(52) U.S. Cl.
  CPC .............. *G06F 21/31* (2013.01); *G06F 21/41* (2013.01); *G06F 21/629* (2013.01); *H04L 67/16* (2013.01); *H04L 67/306* (2013.01); *H04L 67/10* (2013.01)

(56) References Cited

U.S. PATENT DOCUMENTS

| | | | |
|---|---|---|---|
| 8,914,516 | B2 | 12/2014 | Warren et al. |
| 2008/0148240 | A1* | 6/2008 | Jones ................... G06F 11/3612 717/130 |
| 2011/0016379 | A1 | 1/2011 | Mccoll et al. |
| 2011/0185305 | A1 | 7/2011 | Lai et al. |
| 2012/0151314 | A1 | 6/2012 | Campbell et al. |
| 2012/0330995 | A1 | 12/2012 | Muenkel |
| 2013/0124957 | A1 | 5/2013 | Oppenheimer et al. |
| 2013/0132856 | A1 | 5/2013 | Binyamin et al. |
| 2013/0185362 | A1* | 7/2013 | Clagg ................... G06F 21/629 709/206 |
| 2013/0246513 | A1 | 9/2013 | Zaveri et al. |
| 2013/0246932 | A1 | 9/2013 | Zaveri et al. |
| 2014/0032759 | A1* | 1/2014 | Barton .................... H04L 67/10 709/225 |
| 2014/0136937 | A1* | 5/2014 | Patel .................... G06F 17/246 715/212 |
| 2014/0245253 | A1 | 8/2014 | Goldfeder |
| 2014/0280861 | A1* | 9/2014 | Anderson ........... H04L 41/0876 709/224 |
| 2014/0317640 | A1* | 10/2014 | Harm .................... G06F 9/4843 719/320 |
| 2015/0121462 | A1* | 4/2015 | Courage ................. H04L 63/08 726/4 |
| 2015/0227726 | A1* | 8/2015 | Grigg ..................... G06F 21/31 726/7 |
| 2015/0286655 | A1 | 10/2015 | von haden et al. |
| 2015/0331841 | A1 | 11/2015 | Antebi et al. |
| 2015/0339328 | A1 | 11/2015 | Namini |
| 2015/0347372 | A1 | 12/2015 | Waldman et al. |
| 2016/0085738 | A1 | 3/2016 | Briggs |
| 2016/0085962 | A1* | 3/2016 | Sokolov .................. G06F 21/45 726/6 |
| 2016/0154780 | A1 | 6/2016 | Otero et al. |
| 2017/0302653 | A1* | 10/2017 | Ortner ................. G06F 21/6218 |
| 2018/0276060 | A1 | 9/2018 | Arumugam |
| 2018/0295194 | A1* | 10/2018 | Deraz ..................... H04L 67/16 |

OTHER PUBLICATIONS

"Extend Upsell Potential with Cloud-Based Spreadsheet Functionality", Retrieved From: http://oxpp.net/wp-content/uploads/2014/07/OX_Spreadsheet_Datasheet.pdf, Jul. 2014, 2 Pages.

"Non Final Office Action Issued in U.S. Appl. No. 15/481,998", dated Oct. 5, 2018, 14 Pages.

"International Search Report and Written Opinion Issued in PCT Application No. PCT/US2018/024985", dated Jun. 7, 2018, 12 Pages.

Pendolino, Mark, et al., "Smartsheet Blog", Retrieved From: https://www.smartsheet.com/blog/smartsheet-tips-working-offline, Nov. 26, 2014, 19 Pages.

Patankar, Vinay, "Microsoft Excel vs. Google Sheets: The Spreadsheet Showdown", https://www.process.st/microsoft-excel-vs-google-sheets/, Published on: Jun. 9, 2016, 10 pages.

"Work With Worksheet Data in Onedrive", https://support.office.com/en-ie/article/Work-with-worksheet-data-in-OneDrive-c051a205-1c06-4feb-94d8-793b0126b53a, Retrieved on: Dec. 13, 2016, 5 pages.

"Oracle Fusion Financials", http://web.archive.org/web/20101011123411/http:/www.oracle.com/us/products/applications/fusion/fusion-finance-solution-brief-173012.pdf, Published on: Oct. 11, 2010, 2 pages.

"Non Final Office Action Issued in U.S Appl. No. 15/481,998", dated May 31, 2019, 12 Pages.

Shiohara, et al., "A Concept of Extending Spreadsheet Cell Functions for Web Application Development Based on a Cloud Platform", In Proceedings of the IEEE Workshop on Advanced Research and Technology in Industry Applications, Sep. 29, 2014, pp. 1362-1365.

"Final Office Action Issued in U.S. Appl. No. 15/481,998", dated Dec. 11, 2019, 12 Pages.

* cited by examiner

CREDENTIAL-BASED PROACTIVE DISCOVERY OF REMOTE MICRO-SERVICES BY SPREADSHEET APPLICATIONS

CROSS-REFERENCE TO RELATED APPLICATIONS

This application is related to co-pending U.S. patent application Ser. No. 15/481,998, entitled "TECHNIQUES FOR SUPPORTING REMOTE MICRO-SERVICES AS NATIVE FUNCTIONS IN SPREADSHEET APPLICATIONS," which was filed on the same day as this application, the contents of which are expressly incorporated by reference herein.

BACKGROUND

Spreadsheet applications such as, for example, Microsoft Excel®, are widely used in many fields and are increasingly important for analyzing data in today's business and computing environments. For example, data analysts predominately use client-side spreadsheet applications as tools for performing spreadsheet tasks including, but not limited to, consolidating and massaging data, producing charts, performing complex calculations, and the like. Likewise, data science teams regularly utilize cloud-based analytics platforms (or cloud services) such as, for example, Azure® Machine Learning (AzureML), to generate and execute data science models. For example, data science teams develop micro-services, e.g., web services or algorithms, that are accessed and executed via the cloud-based analytics platforms.

Unfortunately, these micro-services are not readily available or discoverable by data analysts seeking to benefit from the work of the data science teams. Moreover, even if the micro-services are discoverable, making the micro-services available can be exceedingly difficult as each individual micro-service must be individually ported (or re-coded) as a native spreadsheet function.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to proactively discovering remote micro-services by spreadsheet applications, e.g., Microsoft Excel®. In an implementation, a method of operating a spreadsheet application to proactively discover remote micro-services based on credential information is disclosed. The method includes identifying the credential information associated with a user of the spreadsheet application responsive to detecting a micro-service updating event and proactively discovering one or more micro-services that are available to the user of the spreadsheet application through a cloud service platform based on the credential information. The method further includes persisting a list including the one or more micro-services that are available to the user of the spreadsheet application based on the credentials.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Various embodiments of the present technology generally relate to proactively discovering remote micro-services as native functions in spreadsheet applications. More specifically, the techniques describe a client-side spreadsheet application that can access functionalities, e.g., micro services, from a cloud-based analytics platform (or cloud service), e.g., Azure Machine Learning, using access rights associated with a user of the spreadsheet application or the spreadsheet application itself.

In some embodiments, the spreadsheet application communicates the user's credentials or credential information derived from the user's credentials to a cloud-based analytics platform (or cloud service platform). The cloud-based analytics platform uses the credential information to identify micro-services (or functions) that are available to the user and provides the spreadsheet application The cloud-based analytics platform then provides the spreadsheet application with information about the available micro-services (or functions) available for exposing to the user.

As discussed herein, access rights can be managed from the cloud-based analytics platform. For example, a data scientist from a multi-disciplinary team that includes data scientists and analysts can generate micro-services (e.g., algorithms) and grant or otherwise assign access rights based on user credentials to other team members including analysists and other data scientists. The micro-services can then be proactively discovered by spreadsheet applications based on corresponding credential information associated with users of those applications.

At least one technical effect enabled by the techniques discussed herein is the ability for multi-disciplinary teams to dynamically benefit from each other's work. More specifically, the techniques resolve issues of the prior art by bridging the gap between data scientists and the analysts by dynamically discovering algorithms that are available and of use to the data scientists.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to credential-based proactive discovery of remote micro-services by spreadsheet applications, embodiments of the present technology are equally applicable to various other applications such as locating equipment.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
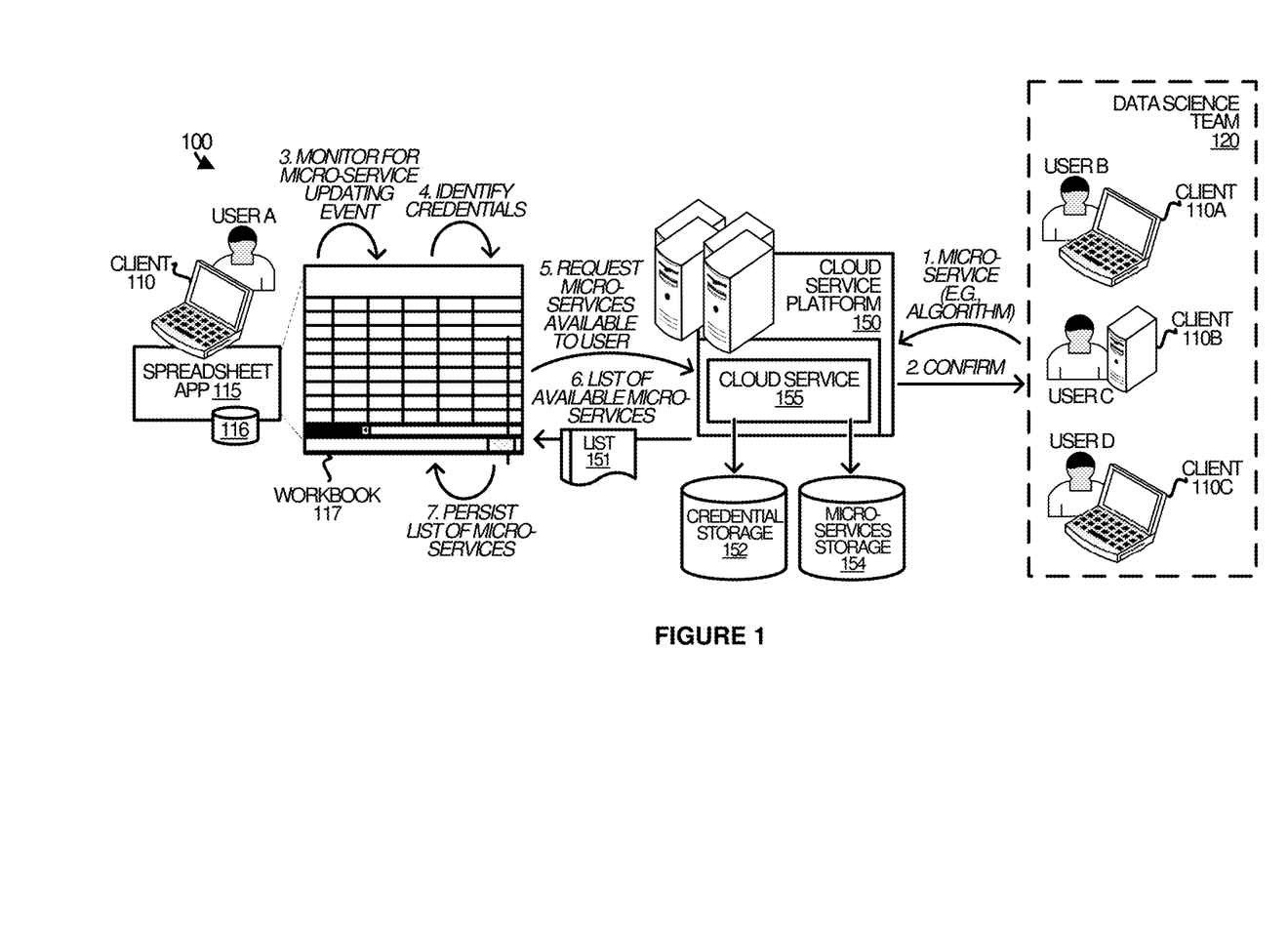
FIG. 1 depicts a block diagram illustrating an example operational architecture for credential-based proactive discovery of remote micro-services, according to some embodiments.

FIG. 1 depicts a block diagram illustrating an example operational architecture 100 for credential-based proactive discovery of remote micro-services, according to some embodiments. More specifically, the example of FIG. 1 illustrates operation of spreadsheet application 115 for obtaining a listing or list 151 of micro-services that are available to a user, e.g., user A of spreadsheet application 115 based on credential information. The example operational architecture 100 includes a client device 110, a cloud service platform 150 and data science team 120. The cloud service platform 150 includes a credential storage container 152 and micro services storage container 154. The cloud service platform 150 executes cloud service 155. Alternative configurations including fewer or additional components are possible.

Figure 7:
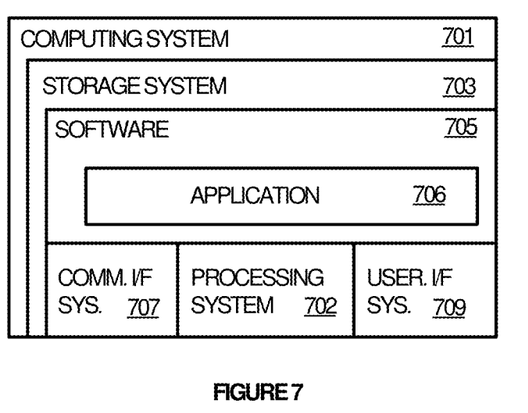
FIG. 7 is a block diagram illustrating a computing system suitable for implementing the technology disclosed herein, including any of the applications, architectures, elements, processes, and operational scenarios and sequences illustrated in the Figures and discussed below in the Technical Disclosure.

As shown in the example of FIG. 1, workbook 117 is opened on client device 110 with spreadsheet application 115. The spreadsheet application 115 can include functionality including GUIs (graphical user interface) running on client device 110, e.g., a PC, mobile phone device, a Web server, or other application servers. Such systems may employ one or more virtual machines, containers, or any other type of virtual computing resource in the context of supporting cloud-based micro-services as native functions within the spreadsheet application 115 of which the computing system 701 of FIG. 7 is representative. The spreadsheet application 115 includes storage container 116. As discussed herein, storage container 116 is configured to store or persist a list 151 of micro-services that are available to a user e.g., user A, of the spreadsheet application 115.

The cloud service platform 150 executes cloud service 155. Cloud service platform 150 is representative of any cloud service or collection of services that is configured to facilitate the proactive discovery of micro-services, e.g., web services or algorithms, by a spreadsheet application based on credential information associated with a user of the spreadsheet application. For example, the cloud service platform 150 can be a cloud-based analytics platform such as, for example, Azure® Machine Learning (AzureML), that facilitates generation, access and execution of micro-services. Other cloud-based platforms are also possible. In operation, users of the cloud service platform 150, e.g., members of data science teams, can use the cloud service platform 150 to develop, access and execute micro-services. The micro-services can each have associated access rights which are stored in credential storage container 152. The access rights can be assigned to each micro-service by, for example, a member of the data science team 120 allowing the members of data science team 120 to provide access to other members of the teams e.g., other data scientists, as well as other users on different teams, e.g., data analysts. A data analyst, e.g., user A, operating spreadsheet application 115 can then request and subsequently access the list 151.

The cloud service platform 150 may include server computers, blade servers, rack servers, and any other type of computing system (or collection thereof) suitable for carrying out a service or collection of services and for interfacing with the users of the service. The cloud service platform 150 can include GUIs (graphical user interface) running on a PC, mobile phone device, a Web server, or even other application servers. Such systems may employ one or more virtual machines, containers, or any other type of virtual computing resource in the context of supporting a service or collection of services, e.g., an analytics platform, of which the computing system 701 of FIG. 7 is representative.

As shown in the example of FIG. 1, the data science team 120 includes member users B, C and D each operating a corresponding client system 110B, 110C, and 110D, respectively. It is appreciated that the data science team 120 can include any number of members, e.g., more or fewer than the three members shown in the example of FIG. 1. Members of the data science team 120, e.g., user B, user C, and user D, can utilize cloud service platform 150, e.g., a cloud-based analytics platform such as, for example, Azure® Machine Learning (AzureML), to generate and execute data science models.

In operation, a member of the data science team 120, e.g., user C, develops a data science model including at least one micro-service, e.g., web service or algorithm, on cloud service 155 operating on the cloud service platform 150 (step 1). As discussed herein, the member of the data science team creating the micro-service can also provide access rights for the micro-service. The access rights can be managed from the cloud service 155, e.g., the cloud-based analytics platform. For example, a member of data science team 120 can grant or otherwise assign access rights based on user credentials to other users (other team and non-team members) including data analysts and other data scientists.

As shown in the example of FIG. 1, the member of the data science team 120, e.g., user C, that creates the micro-service can also provide access rights information granting user A, e.g., a data analyst, with access to the micro-service. In some embodiments, the cloud service 155 then provides a confirmation to the member of the data science team 120, e.g., user C, that the micro-service has been successfully created and persisted on cloud service platform 150 (step 2).

Once persisted, the micro-service can be proactively discovered by spreadsheet application 115 based on credential information associated with a user of the spreadsheet application 115, e.g., user A. Initially, the discovery process includes monitoring, by spreadsheet application 115, for occurrence of micro-service updating events (step 3). As discussed herein, the micro-service updating events can include, among others, launching of the spreadsheet application, an idle event, continuous operation of the spreadsheet application occurring for a threshold period, or by way of a manual intervention by the user of the spreadsheet.

Responsive to detecting a micro-service updating event, the spreadsheet application identifies credential information for providing to the cloud service 155 (step 4). As discussed herein, the credential information can be associated with a user of the spreadsheet application, e.g., user A, or, in some instances, the spreadsheet application itself. The spreadsheet application 115 then commences a proactive discovery of one or more micro-services that are available to the user of the spreadsheet application 115 through cloud service platform 150 based on the credential information. The discovery process can include requesting the micro-services that are available to user A (step 5). In some embodiments, spreadsheet application 115 first performs an authentication procedure using the credential information. For example, the authentication procedure can include sending a request for authentication and responsively receiving an access token. In some embodiments, the cloud service platform 150 performs the authentication; however, other authentication platforms or engines (not shown) are also possible.

Next, responsive to the request for micro-services available to the user, the cloud service 155 uses the credential information to identify the micro-services to which the user has access based on the credential information. The cloud service 155 generates list 151 containing the available micro-services and provides the list 151 to spreadsheet application 115 (step 6). Lastly, the spreadsheet application persists list 151 in storage container 116 (step 7).

Figure 2:
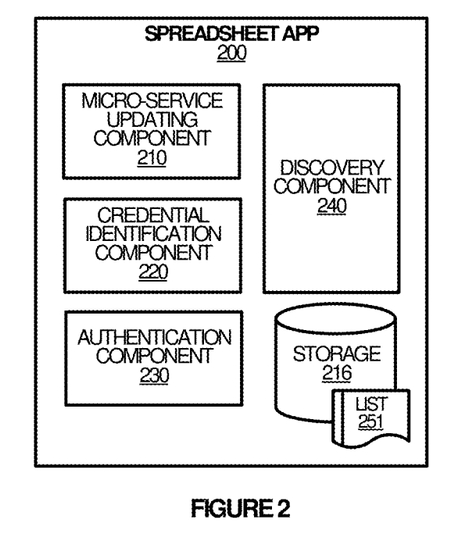
FIG. 2 depicts example components of a spreadsheet application, according to some embodiments.

FIG. 2 depicts example components of a spreadsheet application 200, according to some embodiments. The spreadsheet application 200 can be spreadsheet application 115 of FIG. 1, although alternative configurations are possible. The functions represented by the components, modules and/or engines described with reference to FIG. 2 can be implemented individually or in any combination thereof, partially or wholly, in hardware, software, or a combination of hardware and software.

As illustrated in the example of FIG. 2, the spreadsheet application 200 includes a micro-service updating component 210, a credential identification component 220, an authentication component 230, a discovery component 240, and a storage container component 216 that can include a list 251. List 251 identifies micro-services that are available to a user of spreadsheet application 200 (post discovery) based on credential information, e.g., user credentials or some other credential information. List 251 may be list 151 of FIG. 1, although alternative configurations are possible. Other systems, databases, and/or components are also possible. Some or all of the components can be omitted in some embodiments.

The micro-service updating component 210 is configured to determine when to update available micro-services or detect a micro-service updating event. As discussed herein, the micro-service updating events can include, among others, launching of the spreadsheet application, an idle event, continuous operation of the spreadsheet application occurring for a threshold period, or by way of a manual intervention by the user of the spreadsheet.

The credential identification component 220 is configured to identify credential information associated with a user of the spreadsheet application. In some embodiments, the identification occurs responsive to detecting the micro-service updating event, however, this process can happen at various times. As discussed herein, the credential information can be associated with a user of the spreadsheet application, e.g., user A of FIG. 1, or, in some instances, the spreadsheet application itself. In some embodiments, the credential information can include cloud service account credentials. For example, the credential information can include a Managed Service Account (MSA)/Azure Active Directory (AAD) for an AzureML cloud service. Other examples or forms of credential information are also possible.

The authentication component 230 is configured to perform an authentication procedure using the credential information. For example, the authentication procedure can include sending a request for authentication and responsively receiving an access token. Example authentication is shown and discussed in greater detail with reference to FIG. 4.

The discovery component 240 is configured to proactively discover one or more micro-services that are available to the user of the spreadsheet application through a cloud service platform based on the credential information. The discovery can include receiving and persisting a list 251 of available micro-services in a storage container 216. Storage container 216 can be storage container 116 of FIG. 1, although alternative configurations are possible.

Figure 3:
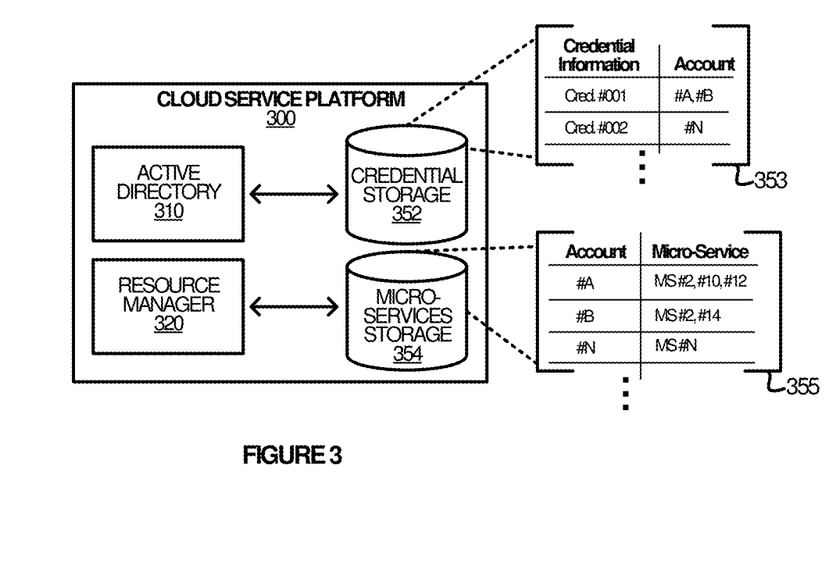
FIG. 3 depicts example components of a cloud service platform, according to some embodiments.

FIG. 3 depicts example components of a cloud service platform 300, according to some embodiments. The cloud service platform 300 can be cloud service platform 150 of FIG. 1, although alternative configurations are possible. The functions represented by the components, modules and/or engines described with reference to FIG. 3 can be implemented individually or in any combination thereof, partially or wholly, in hardware, software, or a combination of hardware and software.

As illustrated in the example of FIG. 3, the cloud service platform includes an active directory 310, a resource manager 320, a credential storage container 352 and a micro-services storage container 354. Other systems, databases, and/or components are also possible. Some or all of the components can be omitted in some embodiments.

The active directory 310 interfaces with a credential storage container 352. As shown in the example of FIG. 3, the credential storage container 352 includes a table 353 identifying cloud service accounts that are associated with corresponding credential information. Likewise, the micro-services storage container 354 includes a table 355 that identifies micro-services that are available for each cloud service account. As discussed herein, a user, e.g., user A, can have multiple accounts in cloud service platform 300. Accordingly, when accessing the cloud service platform 300 with credentials of the spreadsheet app (e.g., Office credentials), the system may identify more than one cloud service account associated with the user. For example, as shown in the example of FIG. 3, cloud service accounts #A and #B are both associated with credentials cred. #001.

The resource manager 320 interfaces with a micro-services storage container 354. As shown in the example of FIG. 3, each cloud service account can include micro-services that are available to a user of that cloud service account. For example, cloud service account #A is associated with micro-services MS #2, #10, and #12. As discussed herein, in some embodiments, the list of micro-services that is provided to a spreadsheet application includes micro-services that are available to the user via more than one cloud service accounts.

Figure 4:
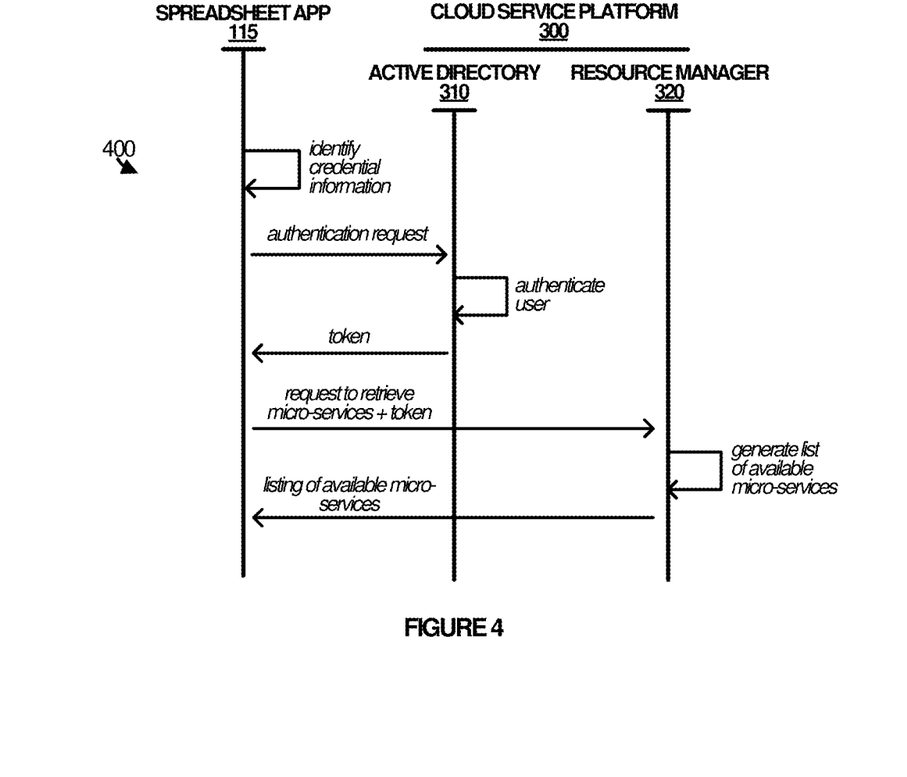
FIG. 4 depicts a sequence diagram illustrating example operations of components of an example operational architecture, according to some embodiments.

FIG. 4 depicts a sequence diagram 400 illustrating example operations of components of an example operational architecture 100, according to some embodiments. As shown in the example of FIG. 4, sequence diagram 400 includes a spreadsheet application, e.g., spreadsheet application 115 and various components a spreadsheet application service, e.g., active directory 310 and resource manager 320 of cloud service platform 300. As discussed herein, the cloud service platform 300 can include additional or fewer components.

To begin, the spreadsheet application 115 identifies credential information associated with a user of the spreadsheet application. The spreadsheet application can then generate an authentication request including the credential information and sends the authentication request for delivery to an active directory 310 of the cloud service platform 300 for authentication. The active directory 310 performs an authentication procedure on the user. When the user is authenticated, as shown in the example of FIG. 4, the active directory 310 provides the spreadsheet application with an authentication token. If the user is not authenticated, the spreadsheet application is not provided with a token and the spreadsheet application is not able to proactively discover micro-services available to the user in the cloud service platform as discussed herein.

The spreadsheet application receives the token and responsively generates a request for available micro-services. The spreadsheet application then sends the request for delivery to the resource manager 320 of the cloud service platform 300. As discussed herein, the request includes credential information and the received access token. The resource manager 320 receives the request, processes the token to make sure the request is valid, and generates a list of available micro-services based on the credential information. Lastly, the spreadsheet application 115 receives the list including the one or more micro-services that are available to the user of the spreadsheet application and persists the list in memory.

Figure 5:
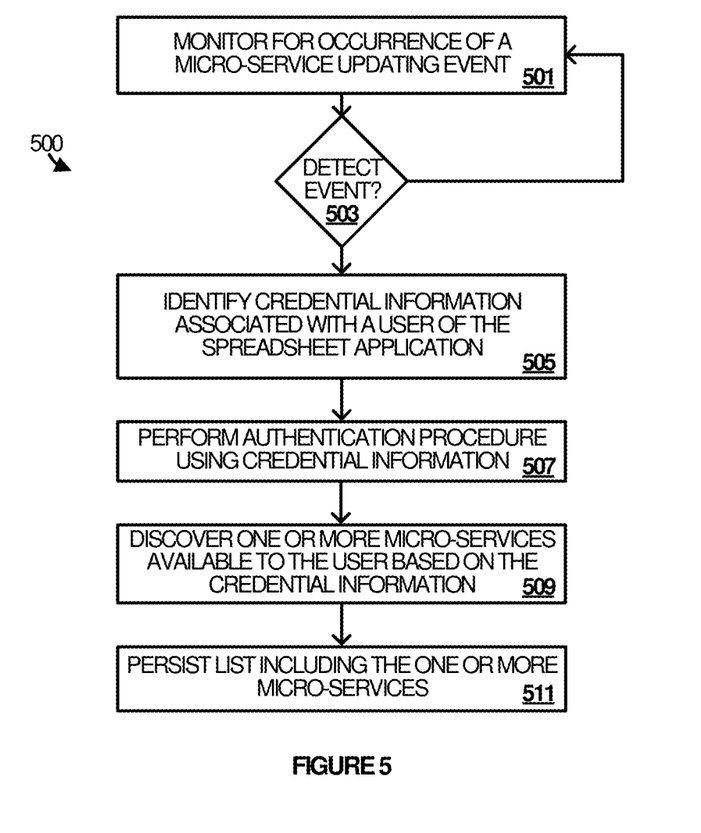
FIG. 5 depicts a flow diagram illustrating example operations of a spreadsheet application for proactively discovering remote micro-services based on credential information, according to some embodiments.

FIG. 5 depicts a flow diagram illustrating example operations 500 of a spreadsheet application for proactively discovering remote micro-services based on credential information, according to some embodiments. The example operations 500 may be performed in various embodiments by a spreadsheet application such as, for example, spreadsheet application 115 of FIG. 1, or one or more processors, extensions, modules, engines, components or tools associated therewith.

To begin, the spreadsheet application monitors for occurrence of a micro-service updating event (step 501). The micro-service updating event is an event that triggers dynamic fetching or discovery of remote micro-services that are available to a user of the spreadsheet application. As discussed herein, the micro-service updating event can be an indication that the spreadsheet application has recently launched on a client device. Alternatively or additionally, the micro-service updating event can be triggered as a result of an idle event, continuous operation of the spreadsheet application for a threshold period, by way of a manual user intervention, etc.

The spreadsheet application then determines whether a micro-service updating event has been detected (step 503). If not, the flow returns to monitoring. Otherwise, the spreadsheet application identifies credential information, e.g., user credentials or some other credential information, associated with a user of the spreadsheet application (step 505). As discussed herein, by way of example and not limitation, the credential information can include cloud service account credentials. For example, the credential information can include a Managed Service Account (MSA)/Azure Active Directory (AAD) for an AzureML cloud service.

The spreadsheet application then performs an authentication procedure using the credential information (step 507). As discussed herein, the authentication procedure can include generating and sending a request for authentication for delivery to the cloud service platform. The request can include the credential information. Responsive to sending the request, the spreadsheet application receives an access token when the request for authentication is authorized.

The spreadsheet application then proactively discovers one or more micro-services that are available to the user of the spreadsheet application through cloud service platform based on the credential information (step 509). The discovery process can include generating and sending a request for available micro-services to the cloud service platform. As discussed herein, the request can include the access token and/or credential information. Responsive to sending the request for available micro-services, the spreadsheet application receives a list, e.g., list 151, including the one or more micro-services that are available to the user of the spreadsheet application.

Lastly, the spreadsheet application persists the list including the one or more micro-services that are available to the user of the spreadsheet application (step 511).

Figure 6:
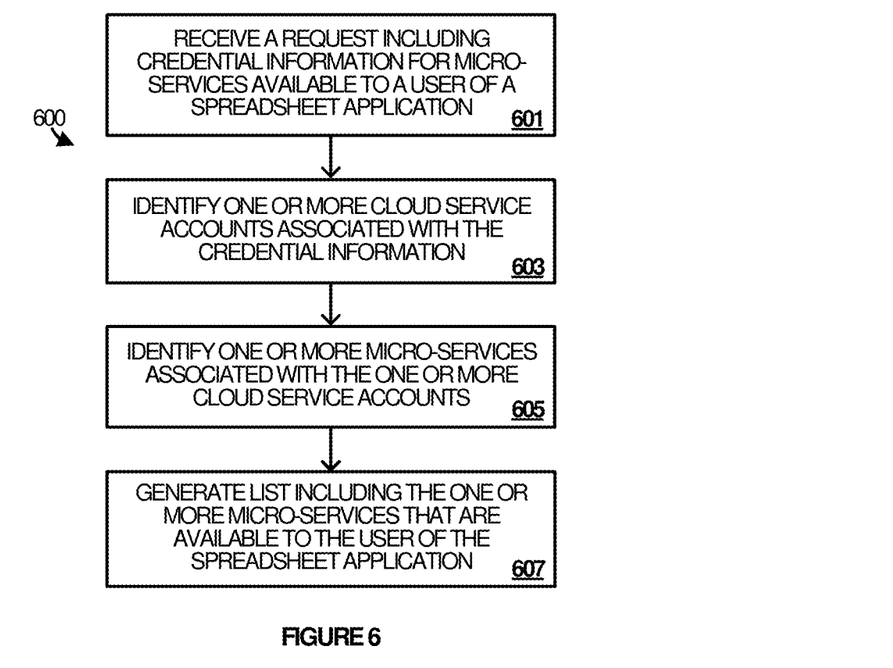
FIG. 6 depicts a flow diagram illustrating example operations of a cloud service for providing a listing micro-services available to a user of a spreadsheet application based on credential information provided by the spreadsheet application, according to some embodiments.

FIG. 6 depicts a flow diagram illustrating example operations 600 of a cloud service for providing a listing microservices available to a user of a spreadsheet application based on credential information provided by the spreadsheet application, according to some embodiments. The example operations 600 may be performed in various embodiments by a cloud service such as, for example, cloud service 155 of FIG. 1, or one or more processors, extensions, modules, engines, components or tools associated therewith.

To begin, the cloud service receives a request for micro-services that are available to the user of the spreadsheet application (step 601). Responsive to receiving the request, the cloud service identifies one or more cloud service accounts that are associated with the credential information (step 603). As discussed herein, the cloud service may identify more than one cloud service account associated with the user credentials. Once the cloud service accounts associated with the credential information are identified, the cloud service then identifies one or more micro-services that are associated with the cloud service accounts (605). Lastly, the cloud service generates a list including the one or more micro-services that are available based on the credential information and provides the list to the spreadsheet application.

FIG. 7 illustrates computing system 701, which is representative of any system or collection of systems in which the various applications, services, scenarios, and processes disclosed herein may be implemented. For example, computing system 701 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and an optional user interface system 709.

Processing system 702 loads and executes software 705 from storage system 703. When executed by processing system 702 for deployment of scope-based certificates in multi-tenant cloud-based content and collaboration environments, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing the software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by the processing system 702, direct the processing system 702 to operate as described with respect to the various operational scenarios, sequences, and processes illustrated herein. For example, software 705 may include program instructions for directing the system to perform the processes described with reference to FIGS. 2-5.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or application software. Software 705 may also comprise firmware or some other form of machine-readable processing instructions executable by processing system 702.

In general, software 705 may, when loaded into processing system 702 and executed, transform a suitable apparatus, system, or device (of which the computing system 701 is representative) overall from a general-purpose computing system into a special-purpose computing system. Indeed, encoding software on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. In some cases, the user interface system 709 may be omitted when the computing system 701 is implemented as one or more server computers such as, for example, blade servers, rack servers, or any other type of computing server system (or collection thereof).

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Certain inventive aspects may be appreciated from the foregoing disclosure, of which the following are various examples.

Example 1

A method of operating a spreadsheet application to proactively discover remote micro-services based on credential information, the method comprising responsive to detecting a micro-service updating event, identifying the credential information associated with a user of the spreadsheet application. The method further comprising proactively discovering one or more micro-services that are available to the user of the spreadsheet application through a cloud service platform based on the credential information, and persisting a list including the one or more micro-services that are available to the user of the spreadsheet application based on the credential information.

Example 2

The method of Example 1, further comprising monitoring for occurrence of the micro-service updating event.

Example 3

The method of Examples 1-2, wherein the micro-service updating event comprises launching of the spreadsheet application.

Example 4

The method of Examples 1-3, wherein the micro-service updating event comprises one or more of an idle event, continuous operation of the spreadsheet application for a threshold period, or a manual intervention by the user.

Example 5

The method of Examples 1-4, further comprising performing an authentication procedure using the credential information.

Example 6

The method of Examples 1-5, wherein performing the authentication procedure comprises generating a request for authentication including the credential information, sending the request for delivery to the cloud service platform, and responsive to sending the request, receiving an access token when the request for authentication is authorized.

Example 7

The method of Examples 1-6, wherein the request for authentication is performed by an authentication sub-service of the cloud service platform.

Example 8

The method of Examples 1-7, wherein proactively discovering the one or more micro-services comprises generating a request for available micro-services for delivery to the cloud service platform, wherein the request includes the access token. The method further comprises receiving the list including the one or more micro-services that are available to the user of the spreadsheet application.

Example 9

The method of Examples 1-8, wherein the credential information is associated with multiple accounts within the cloud service platform, and the list includes micro-services available to the user for each of the multiple accounts within the cloud service platform.

Example 10

A method of proactively discovering cloud-based micro-services from a spreadsheet application based on credential information, the method comprising detecting a micro-service updating event and identifying the credential information responsive to the micro-service updating event. The credential information is associated with a user of a spreadsheet application. The method further comprises, responsive to detecting the micro-service updating event, sending a request to a resource manager component of a cloud service platform for a list of one or more micro-services that are available to the user of the spreadsheet application based on the credential information, and once the list of one or more micro-services that are available to the user of the spreadsheet application is received, persisting the list in memory.

Example 11

The method of Example 10, further comprising monitoring for occurrence of the micro-service updating event.

Example 12

The method of Examples 10-11, wherein the micro-service updating event comprises one or more of launching of the spreadsheet application, an idle event, a continuous operation of the spreadsheet application for a threshold period, or a manual intervention by the user.

Example 13

The method of Examples 10-12, further comprising performing an authentication procedure using the credential information.

Example 14

The method of Examples 10-13, wherein performing the authentication procedure comprises generating a request for authentication including the credential information, sending the request for delivery to the cloud service platform, and responsive to sending the request, receiving an access token when the request for authentication is authorized.

Example 15

The method of Examples 10-14, wherein the request for authentication is performed by an authentication sub-service of the cloud service platform.

Example 16

The method of Examples 10-15, wherein the request for the list of one or more micro-services that are available to the user of the spreadsheet application based on the credential information includes the access token.

Example 17

The method of Examples 10-16, wherein the credential information is associated with multiple accounts within the cloud service platform, and the list includes micro-services available to the user for each of the multiple accounts within the cloud service platform.

Example 18

An apparatus comprising one or more computer readable storage media and program instructions stored on the one or more computer readable storage media which, when executed by a processing system, direct the processing system to at least responsive to detecting a micro-service updating event, identify credential information associated with a user of a spreadsheet application. The instructions, when executed by the processing system, further direct the processing system to proactively discover one or more micro-services that are available to the user of the spreadsheet application through a cloud service platform based on the credential information and persist a list including the one or more micro-services that are available to the user of the spreadsheet application based on the credential information.

Example 19

The apparatus of Example 18, wherein the program instructions, when executed by the processing system, further direct the processing system to at least perform an authentication procedure using the credential information, wherein to perform the authentication procedure, the program instructions further direct the processing system to at least generate a request for authentication including the credential information, send the request for delivery to the cloud service platform, and receive an access token when the request for authentication is authorized.

Example 20

The apparatus of Examples 18-19, wherein to proactively discover the one or more micro-services, the program instructions, when executed by the processing system further direct the processing system to generate a request for available micro-services for delivery to the cloud service platform and receive the list including the one or more micro-services that are available to the user of the spreadsheet application. The request includes the access token.

What is claimed is:

1. A device-implemented method of proactively discovering cloud-based micro-services from a spreadsheet application based on credential information associated with an account of a cloud service platform, the method comprising:
   monitoring, by the spreadsheet application, for occurrence of a micro-service updating event;
   responsive to detecting the micro-service updating event:
      identifying, by the spreadsheet application, the credential information;
      sending, by the spreadsheet application and to the cloud service platform, a request comprising the credential information;
      responsive to a successful authorization of the request, receiving an access token associated with the account; and
      responsive to a successful authorization of an additional request comprising the credential information and the access token, obtaining, by the spreadsheet application, a list comprising at least one remote micro-service available to the account;
   responsive to obtaining the list, persisting, by the spreadsheet application, the list in memory; and
   based at least on the list, enabling display, by the spreadsheet application, of the remote micro-service as a native function in the spreadsheet application.

2. The method of claim 1, wherein the micro-service updating event comprises at least one of launching of the spreadsheet application, an idle event, a continuous operation of the spreadsheet application for a threshold period, and a manual intervention.

3. The method of claim 1, wherein enabling display of the remote micro-service is based at least on the list persisted in memory.

4. The method of claim 1, wherein obtaining the list comprises:
   generating the additional request;
   sending the additional request to the cloud service platform; and
   responsive to the successful authorization of the additional request, receiving the list.

5. The method of claim 1, wherein the successful authorization of the request is performed by an authentication sub-service of the cloud service platform.

6. The method of claim 1, further comprising:
   responsive to invoking the remote micro-service, executing the remote micro-service.

7. The method of claim 1, wherein the account of the cloud service platform comprises multiple accounts within the cloud service platform, and the list includes micro-services available for each of the multiple accounts within the cloud service platform.

8. An apparatus comprising:
   one or more non-transitory computer readable storage media; and
   a spreadsheet application stored on the one or more non-transitory computer readable storage media, the spreadsheet application including program instructions which, when executed by a processing system, direct the processing system to at least:
      monitor the spreadsheet application for occurrence of a micro-service updating event;
      responsive to detecting the micro-service updating event:
         identify credential information;
         send to a cloud service platform, a request comprising the credential information;
         responsive to a successful authorization of a request, obtain an access token associated with at least an account of the cloud service platform;
         send, to the cloud service platform an additional request comprising the credential information and the access token;
         responsive to a successful authorization of the additional request, receive a list comprising at least one remote micro-service;
         persist the list in memory; and
         based at least on the list, enable display of the at least one remote micro-service as a native function in the spreadsheet application.

9. The apparatus of claim 8, wherein to receive the list, the program instructions, when executed by the processing system further direct the processing system to:
   generate the additional request;
   send the additional request to the cloud service platform; and
   responsive to the successful authorization of the additional request, receive the list.

10. The method of claim 1, wherein the micro-service updating event comprises continuous operation of the spreadsheet application for a threshold period.

11. The method of claim 1, wherein the spreadsheet application comprises a client-side application.

12. The apparatus of claim 8, wherein the micro-service updating event comprises at least one of launching of the spreadsheet application, an idle event, a continuous operation of the spreadsheet application for a threshold period, and a manual intervention.

13. The apparatus of claim 8, wherein the micro-service updating event comprises continuous operation of the spreadsheet application for a threshold period.

14. A non-transitory computer readable storage media having program instructions stored thereon that, when executed by a processing system, direct the processing system to at least:
   monitor a spreadsheet application for occurrence of a micro-service updating event;
   responsive to detecting the micro-service updating event:
   identify credential information;
   send to a cloud service platform, a request comprising the credential information;
   responsive to a successful authorization of a request comprising the credential information, obtain an access token associated with at least an account of the cloud service platform;
   send, to the cloud service platform, an additional request comprising the credential information and the access token;
   responsive to a successful authorization of the additional request, receive a list comprising at least one remote micro-service;
   persist the list in memory; and
   based at least on the list, enable display of the at least one remote micro-service as a native function in the spreadsheet application.

15. The non-transitory computer readable storage media of claim 14, wherein the micro-service updating event comprises at least one of launching of the spreadsheet application, an idle event, a continuous operation of the spreadsheet application for a threshold period, and a manual intervention.

16. The non-transitory computer readable storage media of claim 14, wherein the micro-service updating event comprises continuous operation of the spreadsheet application for a threshold period.

17. The non-transitory computer readable storage media of claim 14, wherein to receive the list, the program instructions, when executed by a processing system, direct the processing system to:
generate the additional request;
send the additional request to the cloud service platform; and
responsive to the successful authorization of the additional request, receive the list.

18. The non-transitory computer readable storage media of claim 14, wherein the successful authorization of the request is performed by an authentication sub-service of the cloud service platform.

19. The non-transitory computer readable storage media of claim 14, wherein the program instructions, when executed by a processing system, further direct the processing system to:
responsive to an invocation of the remote micro-service, execute the remote micro-service.

20. The non-transitory computer readable storage media of claim 14, wherein the account of the cloud service platform comprises multiple accounts within the cloud service platform, and the list includes micro-services available for each of the multiple accounts within the cloud service platform.

* * * * *